United States Patent
Wolfson

[11] Patent Number: 6,036,314
[45] Date of Patent: Mar. 14, 2000

[54] APERTURED CONTACT LENSES

[76] Inventor: Leonard G. Wolfson, 15 Varick Rd., Waban, Mass. 02168

[21] Appl. No.: 09/237,439

[22] Filed: Jan. 26, 1999

[51] Int. Cl.[7] ....................................... G02C 7/04
[52] U.S. Cl. .................................. 351/160 R; 351/160 H
[58] Field of Search ........................... 351/160 R, 160 H, 351/161, 162, 177

[56] References Cited

U.S. PATENT DOCUMENTS

| | | | |
|---|---|---|---|
| Re. 29,229 | 5/1977 | Girard et al. | 351/160 R |
| Re. 31,406 | 10/1983 | Gaylord | 351/160 R |
| 3,220,960 | 11/1965 | Wichterle et al. | 260/2.5 |
| 3,227,855 | 1/1966 | Meyer, Sr. et al. | 219/384 |
| 3,228,741 | 1/1966 | Becker | 351/160 R |
| 3,808,178 | 4/1974 | Gaylord | 260/86.1 E |
| 3,808,179 | 4/1974 | Gaylord | 260/86.1 E |
| 3,833,786 | 9/1974 | Brucker | 219/121 L |
| 3,950,315 | 4/1976 | Cleaver | 351/160 R |
| 3,971,910 | 7/1976 | Marschalko et al. | 219/121 L |
| 4,068,933 | 1/1978 | Seiderman | 351/160 R |
| 4,120,570 | 10/1978 | Gaylord | 351/160 R |
| 4,194,814 | 3/1980 | Fischer et al. | 351/160 R |
| 4,211,476 | 7/1980 | Brummel et al. | 351/160 R |
| 4,353,849 | 10/1982 | Lewison | 351/160 H |
| 4,435,050 | 3/1984 | Poler | 351/160 R |
| 4,466,705 | 8/1984 | Michelson | 351/160 H |
| 4,540,417 | 9/1985 | Poler | 623/5 |
| 4,621,912 | 11/1986 | Meyer | 351/160 R |
| 4,666,267 | 5/1987 | Wichterle | 351/160 H |
| 4,709,966 | 12/1987 | Michelson | 351/160 H |
| 4,909,896 | 3/1990 | Ikushima et al. | 351/160 H |
| 5,104,213 | 4/1992 | Wolfson | 351/160 R |
| 5,293,186 | 3/1994 | Seden et al. | 351/160 R |

*Primary Examiner*—Scott J. Sugarman
*Attorney, Agent, or Firm*—Samuels, Gauthier & Stevens

[57] ABSTRACT

An apertured polymer button in which that portion of the button which is machined and polished to produce a contact lens contains apertures having a diameter of 5 to 8 microns to allow the passage through the finished lens of fluids containing dissolved oxygen.

8 Claims, 1 Drawing Sheet

APERTURED CONTACT LENSES

BACKGROUND OF THE INVENTION

1. Field of the Invention

The invention pertains to a polymer button which contains apertures which button is polished to form a contact lens which allows for the transport of dissolved oxygen along the lens/cornea interface.

2. Description of the Prior Art

The machining of polymer buttons or disks to produce contact lenses is old art and has been practiced for many decades. The buttons are generally cut from rods of solid polymer which have been prepared by extrusion or polymerization in a suitable, usually cylindrical mold or are cut or punched from sheets of polymer.

The buttons may be cylindrical and have straight vertical sides or may have a collar, depending upon the holder which is to be used to hold the button during the lathing, machining and/or polishing operation.

Hard or rigid contact lenses have traditionally been lathed from buttons containing poly(methyl methacrylate), referred to as PMMA. In addition to the PMMA homopolymer, copolymers containing a crosslinking monomer for greater rigidity and solvent resistance, as well as other comonomers have also been used in the preparation of buttons for conversion to hard contact lenses. While the inexpensive lenses comprising PMMA or its copolymers provided excellent vision correction, they caused a significant portion of the lens-wearing population to suffer from edema, i.e. redness or swelling of the eye, due to the very low oxygen permeability of the lens, and an increased corneal thickness.

While silicone rubber lenses (U.S. Pat. No. 3,228,741) were highly permeable to oxygen, they were poor optical devices and, due to their hydrophobicity, they were poorly wettable by tears and were very uncomfortable to wear. Further, they were prepared directly by casting rather than from buttons since they could not be machined or polished.

Soft hydrophilic lenses based on hydrated poly (hydroxyethyl methacrylate) (HEMA) (U.S. Pat. No. 3,220,960) have provided improved oxygen permeability by virtue of their water content. The usual procedure for the preparation of soft HEMA lenses involves either direct polymerization in a mold or rotational casting, although in some instances, the hard product produced by polymerization to a rod or button has been subjected to lathing. In either case, the shaped polymer is subjected to hydration, e.g. by soaking in saline solution, to form the soft lens. The latter is a poor optical device and is characterized by the accumulation and absorption of harmful compounds and pathological organisms, the necessity of special handling and treatment because of the high water content and difficulties in correcting astigmatic vision and other eye problems. In addition, they scratch and tear more easily than PMMA lenses. Further, a significant portion of the population still suffers from edema when wearing these soft lenses.

The invention of the rigid gas permeable (RGP) lens based on the copolymerization of polysiloxanylalkyl acrylic esters (U.S. Pat. Nos. 3,808,178; 4,120,570 and Re-issue 31,406) has overcome the edema problem. This hard, rigid copolymer is usually produced in the form of rods which are cut into buttons and lathed and polished, i.e. the same techniques used traditionally with PMMA, to form an oxygen permeable contact lens which is also an excellent optical device. However, the polysiloxanyl monomer which is responsible for the oxygen permeability is extremely expensive and a relatively high concentration is required to provide the desired gas permeability. As the concentration of the polysiloxanyl monomer is increased, the rigidity is reduced and the wettability by tears is decreased.

The prior art generally teaches either polymer compositions which act as membranes and permit gases to permeate through the contact lens or methods for providing openings in materials conventionally used in the preparation of contact lenses so as to permit the passage of tear fluid as well as the oxygen which is soluble in the aqueous fluid. The tear fluid contains epithelial cells and other metabolites which must be transported away from the cornea.

The prior art teaches the preparation of perforated or apertured contact lenses by means of devices and methods which are applied to individual contact lenses. In normal practice, the lens technician or mechanic machines or lathes a button, prepared by others who are skilled in the arts of polymerization or extrusion, to provide optical surfaces which are then polished to yield the finished contact lens. Under the prior art teachings, the mechanic would then have to use special equipment so as to subject the finished lens to the appropriate method of perforation and fenestration in order to equip the lens with apertures, followed by repolishing.

The more useful and desirable approach to an apertured contact lens involves the preparation of a button having apertures therein which is supplied to the lens maker who then proceeds in the usual manner to prepare a lathed and polished lens which has apertures by virtue of its precursor apertured button.

Japan Kokai Tokyo Koho JP 81,111,625 (Chemical Abstracts, 96, 11716 (1982) discloses the preparation of a perforated disk or button which is useful in the manufacture of contact lenses. The disks are prepared by polymerizing monomer in a plastic cylindrical container containing a number of polyvinyl chloride (PVC) fibers stretched from end to end. The polymerized product, e.g. PMMA, is removed from the cylinder and sliced to obtain disks containing pieces of PVC fibers to obtain a perforated disk.

U.S. Pat. No. 5,104,213 discloses a hard contact lens having first smaller and second larger sets of different sized apertures. Although the lenses as described in this patent did provide improvement for wearers of hard contact lenses, the lenses were expensive to make and in addition to dryness, the wearer could perceive the large center openings in the visual field.

SUMMARY OF THE INVENTION

Unexpectedly, it has been found clinically, that a well distributed pattern and number of apertures arrayed in the lens provides for greater accessibility to oxygen, clearer vision and more comfort than prior art lenses. With 5 to 10 apertures of 5 to 8 microns in diameter accounting for 0.00015 to 0.0008% of the total surface area of the contact lens, a low cost, high optical quality contact lens is provided that improves comfort for the wearer.

Some of the drawbacks associated with the wearing of contact lens are the discomfort due to both 'dry eye' and/or the associated 'red eye' and mucus buildup. These conditions are caused by lack of oxygen in the fluid at the lens/cornea interface. The inability of the fluid to flow across the lens/cornea interface results in the dryness or 'dry eye' with the symptoms of irritation and poor vision. Usually associated with the 'dry eye' is the condition of 'red eye' where the irritation caused by the lens on the cornea results in an inflammation characterized by redness in the cornea.

Based on actual trials conducted with patients where they experienced 'dry eye' and 'red eye' with conventional hard (PMMA or gas permeable) contact lenses, those patients using the PMMA lenses of the invention did not experience during normal use (approximately sixteen (16) hours) 'dry eye' and/or 'red eye' symptoms. That it, the irritation, such as burning or stinging, was eliminated. The number and sizes of the apertures act in concert to enhance the flow of the liquid and dissolved oxygen along the lens/cornea interface.

This specific substantially uniform sizing of the apertures in the lenses, whether hard (PMMA), semi-permeable (PMMA-silicone) or soft (HEMA), significantly enhances the transportation of oxygen to the cornea while providing for the continual flushing of fluids across the cornea. It is believed oxygen dissolved in liquid is moved by mass transport along the interface. The apertures facilitate this flow by allowing fluid flow through the apertures during a blink cycle and/or the apertures induce fluid flow across the lens edge. That is, this flow is believed to result from the periodic variation of pressure as the eyelid passes over the lens. Each time the eyelid passes over the lens, this creates a zone of relatively higher fluid pressure which alternates between the front and the back of the lens. This pressure variation is believed to be the major mechanism for the continual flushing of the fluid film under the lens.

An object of the present invention is to provide a polymer button which may be machined and polished to form a contact lens which is comfortable to wear without the development of edema.

Another object of the present invention is to provide a polymer button which may be machined and polished to form a contact lens which contains apertures of substantially uniform size, which apertures allow for the transmission of oxygen to the film of fluid supporting the lens while preventing the flow of fluid through the apertures.

The invention comprises a button for the manufacture of contact lenses and the lenses manufactured therefrom wherein the lens formed contains an array of substantially uniform apertures each aperture having a diameter of between 5 to 8 microns. Broadly, it is believed the number of apertures in a lens, to achieve the results described above can be between 5 to 90, 0.00015 to 0.007% total area; preferably between 5 to 30, 0.00015 to 0.0024% total surface area and more particularly, 5 to 10.

DETAILED DESCRIPTION OF THE PREFERRED EMBODIMENTS

The conventional polymer button, such as made from PMMA and other polymers and used in the manufacture of contact lenses, is generally about 3 to 7 mm thick and has a diameter of about 12 to 16 mm. The button has the same dimensions whether the polymer is uncrosslinked or crosslinked PMMA. Although various techniques may be used to form apertures in the button, the important requirement in accordance with this invention is that the apertures are arrayed in that portion of the button which becomes the finished lens, have the proper diameter and are formed in the lens in the proper number. Any array of apertures in which the mean distance between the apertures is similar to a regular array is satisfactory.

In one embodiment of this invention, between 5 to 90 apertures are arrayed in the lens, each aperture having a diameter of about 5 to 8 microns so as to permit the passage of oxygen therethrough into the fluid between the interface of the cornea and the lens.

In a preferred embodiment of this invention, typically there are about 30 apertures arrayed across the surface of the lens.

The apertures may be arrayed in a geometric pattern, concentric circles, spoke-like radii, linear grid-like lines, etc. Although the pattern of apertures is preferably uniform, a non-uniform array of apertures is also within the scope of the invention.

Figure 1:
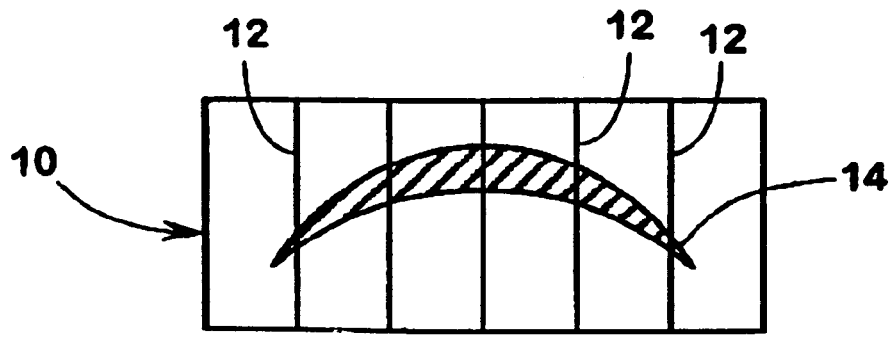
FIG. 1 is a side view of a button wherein the hatched area represents the portion to be machined into a contact lens and the vertical lines represent the fibers in the button.

Referring to FIG. 1, a button is shown generally at 10. Fibers 12 extend through the button 10. The hatched area 14 represents the area to be machined into a lens.

Figure 2:
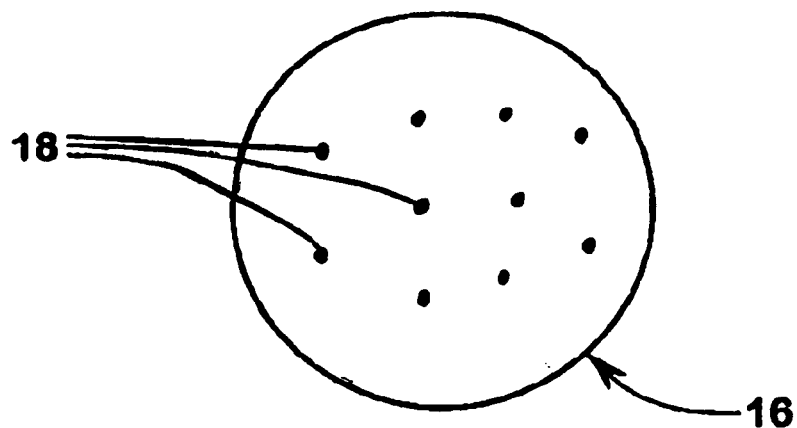
FIG. 2 is a top view of a lens made from a apertured button.
Figure 3:
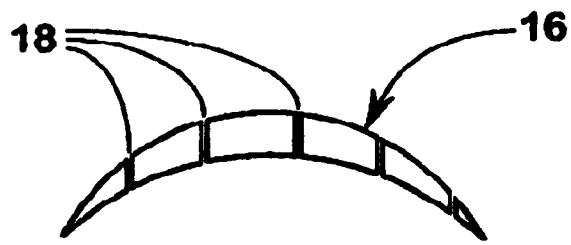
FIG. 3 is a side view of the lens of FIG. 2.

Referring to FIGS. 2 and 3, after the lens 14 is formed the fibers 12 are dissolved leaving a lens 16 having apertures 18.

Preferably, between 5 to 30, apertures 18, each having a diameter of about 8 microns, are uniformly arrayed center to center. As used in this disclosure, the apertures formed in the lens extend completely through the lens as shown in the drawings. Typically, the thickness of a lens will be about $15/100$ of a mm.

The distances between the apertures may be varied without an appreciable affect on the lens characteristics and the patient's comfort. The spacing between apertures may be uniform or non-uniform.

As indicated hereinbefore, the apertures permit the passage of oxygen therethrough. The sizing of the apertures allows the tear fluid to form a thin film on the cornea and to maintain the lens spaced apart from, float on, the cornea. Periodic variation in pressure across the lens creates the continual flushing of the thin film. This results in a sufficient supply of oxygen reaching the cornea via the thin film while removing cells and waste products.

Apertures may be produced in the buttons by numerous procedures including laser techniques, sputtering, ion milling, electrical discharge or other drilling or aperture generating procedures, provided they produce buttons having apertures of the desired size in the appropriate portion of the button from which lenses are machined.

In the preferred embodiment, the lens are made as follows. Five micron glass fibers (Pyrex®) are oriented longitudinally in a casting sock. Orientation takes place in a dry state. Liquid resin PMMA is introduced into the casting sock while maintaining the orientation and position of the glass fibers. When filled with resin PMMA, the casting sock is removed to a curing oven. The curing oven provides rotation about the curing sock's longitudinal axis in order to ensure even distribution of the glass fibers during the curing process. After the PMMA is cured the PMMA is cut into plugs by slicing the casting perpendicular to the longitudinal axis. Plugs are further lathe cut on their perimeter to rough "buttons". Once the button is laboratory ground to accommodate the desired contact lens correction, the new contact lens is immersed in ammonium hydrogen difluoride in order to effectuate micro ventilation by dissolving the embedded glass fibers and leaving micro apertures or fenestrations.

The principles of the invention are equally applicable to hard, semi-permeable and soft contact lenses. Any prior art techniques for forming the apertures may be used and are within the scope of the invention.

The foregoing is exemplary and illustrative as to methods for forming apertured polymer buttons, materials from which the buttons may be prepared and apertured contact lenses produced therefrom, but it is understood that they are not limitive and individuals skilled in the arts involved may make variations therefrom without departing from the teachings.

Having described my invention, what I now claim is:

1. A button for the manufacture of contact lenses worn on a cornea, wherein that portion of the button which is machined to form the lens consists of a plurality of apertures each having a diameter of between 5 and 8 microns and comprising 0.00015 to 0.007% of the total surface area of the lens characterized in that this aperture sizing and the number of apertures enhances the fluid flow along the lens/cornea interface thereby obviating the symptoms of 'dry eye/red eye' with normal use.

2. The button of claim 1 wherein the button is a polymer button.

3. The polymer button of claim 2 wherein the polymer has little or no inherent oxygen permeability.

4. The polymer button of claim 2 wherein the polymer is selected from the group consisting of methyl methacrylate homopolymer and copolymers.

5. The polymer button of claim 2 wherein the polymer is an inherently oxygen permeable polymer.

6. The polymer button of claim 5 wherein the oxygen permeable polymer is selected from the group consisting of polysiloxanylalkyl acrylic ester copolymers, fluorine-containing copolymers and fluoroalkylsiloxane polymers.

7. The polymer button of claim 2 wherein the polymer is a hydrophilic copolymer selected from the group consisting of hydroxyethyl or glyceryl methacrylate copolymers and vinylpyrrolidone copolymers.

8. The contact lens of claims 1, 2, 3, 4, 5, 6 or 7 wherein the apertures comprise 0.00015 to 0.0008 of the total surface area of the lens.

* * * * *